(12) United States Patent
Guo et al.

(10) Patent No.: US 11,953,409 B1
(45) Date of Patent: Apr. 9, 2024

(54) GAS EXTRACTION DEVICE FOR METAL MINERAL INCLUSIONS AND GAS EXTRACTION METHOD THEREFOR

(71) Applicant: Inner Mongolia University of Technology, Hohhot (CN)

(72) Inventors: Xiang-Guo Guo, Hohhot (CN); Zhu Li, Hohhot (CN); Xu Fu, Hohhot (CN); Xudong Yan, Hohhot (CN); Lin Li, Hohhot (CN); Yue-Xing Wang, Hohhot (CN); Zhi Shang, Baoding (CN); Cheng-Hao Ren, Jiaozuo (CN); Dehui Zhang, Beijing (CN)

(73) Assignee: INNER MONGOLIA UNIVERSITY OF TECHNOLOGY, Hohhot (CN)

( * ) Notice: Subject to any disclaimer, the term of this patent is extended or adjusted under 35 U.S.C. 154(b) by 0 days.

(21) Appl. No.: 18/395,562

(22) Filed: Dec. 23, 2023

(30) Foreign Application Priority Data

Dec. 27, 2022 (CN) .......................... 2022116844118

(51) Int. Cl.
*G01N 1/22* (2006.01)

(52) U.S. Cl.
CPC .................................. *G01N 1/2208* (2013.01)

(58) Field of Classification Search
CPC ..................................................... G01N 1/2208
USPC ...................................................... 73/863.21
See application file for complete search history.

(56) References Cited

U.S. PATENT DOCUMENTS

| | | | |
|---|---|---|---|
| 5,224,658 A * | 7/1993 | Smith ..................... | G01N 1/286 241/94 |
| 5,416,024 A * | 5/1995 | Smith .................. | G01N 33/241 850/16 |

FOREIGN PATENT DOCUMENTS

| | | | |
|---|---|---|---|
| CN | 113567212 A | * | 10/2021 |
| CN | 113567212 A | | 10/2021 |
| CN | 115229711 A | * | 10/2022 |
| CN | 115229711 A | | 10/2022 |

OTHER PUBLICATIONS

CNIPA, Notification of First Office Action for CN202211684411.8, dated Jul. 22, 2023.
Inner Mongolia University of Technology (Applicant), Reply to Notification of First Office Action for CN202211684411.8, w/ replacement claims, Aug. 25, 2023.

(Continued)

*Primary Examiner* — Marrit Eyassu
(74) *Attorney, Agent, or Firm* — Zhigang Ma (57) ABSTRACT

A gas extraction device for metal mineral inclusions and a gas extraction method therefor are provided, the device includes a base plate, an annular carrier, sealing covers, a grinding assembly, a vacuum assembly, a gas-gathering assembly and a mass spectrometer. The annular carrier is disposed on the base plate, multiple grinding chambers are defined and evenly distributed in a circular shape on the annular carrier, the sealing covers are disposed at openings of the grinding chambers, the grinding assembly includes grinding hammers, and the grinding hammers penetrate through the sealing covers and extend into the grinding chambers. Side walls of each grinding chamber defines a first through hole and a second through hole. The vacuum assembly is communicated with the grinding chambers through the first through holes. The gas-gathering assembly is communicated with the grinding chambers through the second through holes. The mass spectrometer is communicated with the gas-gathering assembly.

4 Claims, 6 Drawing Sheets

(56) References Cited

OTHER PUBLICATIONS

CNIPA, Notification to grant patent right for invention in CN202211684411.8, dated Oct. 18, 2023.

* cited by examiner

GAS EXTRACTION DEVICE FOR METAL MINERAL INCLUSIONS AND GAS EXTRACTION METHOD THEREFOR

TECHNICAL FIELD

The disclosure relates to the field of geological sample analysis technologies, and particularly to a gas extraction device for metal mineral inclusions and a gas extraction method therefor.

BACKGROUND

The fluids (which can be called fluid inclusions) in which minerals are trapped during their growth preserve a variety of geological and geochemical information such as temperature, pressure, system composition and pondus hydrogenii (pH) about the geologic environment of the time. The composition of materials in the fluid inclusions is the code for deciphering the relevant geological processes. Therefore, a systematic study of the fluid inclusions can obtain information such as temperature and pressure conditions, chemical composition of the fluids, and sources of the fluids in the process of diagenesis and mineralization, so as to identify the evolution and role of geological fluids in the process of diagenesis and mineralization, and explain the process and conditions of diagenesis and mineralization.

Fluid inclusion analysis has been widely used in many research fields, such as geology and mineral resources, oil and gas, construction materials (also referred to as building materials) and gems. Theoretically, all minerals contain inclusions, but those used for research are mainly minerals commonly occurring and abundant in rocks and ores, such as quartz, fluorite, calcite, halite, apatite, barite, cassiterite and sphalerite. However, it is not accurate to infer the simultaneous precipitation of ore minerals and gangue minerals from the same phase of ore-forming fluids solely on the basis of their symbiotic relationship in space. In order to solve this problem, it is particularly important to carry out tests directly on metallic sulfide minerals to obtain direct evidence of the nature of the reacting fluids.

In order to obtain gas of the fluid inclusions in metal minerals, a single static pressure vacuum pulverizer can be used, which has multiple sample chambers but can only be used to apply pressure manually, and the particle size of the sample is less than 100 mesh after the static pressure. Electromagnetic sample crusher also can be used, after a long period of repeated crushing, the sample size after crushing is also less than 100 mesh. In addition, a vacuum decrepitation method can also be used to extract the gas in the fluid inclusions. Since these minerals in the higher decrepitation temperature can release a large amount of hydrogen sulfide (or other sulfur-containing gases), and hydrogen sulfide will decompose to produce hydrogen and solid sulfur at a temperature about 300° C., therefore, it is difficult to get the true composition and content of the gas in the fluid inclusions in the experiment. Moreover, solid sulfur micro-particles can easily block the gas pipeline and the control valves of the detection instrument, so the extraction of metal sulfide minerals using the vacuum decrepitation method is not feasible. The large number of sulfur-containing gases produced by the vacuum decrepitation method during heating will also be corrosive to the instrument, thereby reducing the service life of the instrument.

SUMMARY

In view of this, the disclosure provides a gas extraction device for metal mineral inclusions and a gas extraction method therefor. The disclosure can firstly grind multiple sets of metal mineral samples to release the inclusion gas in the metal minerals, and simultaneously collect and analyze the inclusion gas of the multiple sets of samples, which not only greatly improves the efficiency of the analysis, but also ensures the accuracy of the analysis results.

In order to achieve the above objectives, the disclosure adopts the following technical solutions.

A gas extraction device for metal mineral inclusions includes a base plate, an annular carrier, sealing covers, a grinding assembly, a vacuum assembly, a gas-gathering assembly and a mass spectrometer. The annular carrier is disposed on the base plate, and multiple grinding chambers are defined and evenly distributed in a circular shape on the annular carrier. The sealing covers are disposed at openings of the grinding chambers. The grinding assembly includes grinding hammers, and the grinding hammers penetrate through the sealing covers and extend into the grinding chambers. Side walls of each of the multiple grinding chamber define a first through hole and a second through hole. The vacuum assembly is communicated with the grinding chambers through the first through holes. The gas-gathering assembly is communicated with the grinding chambers through the second through holes. The mass spectrometer is communicated with the gas-gathering assembly.

In an embodiment, the grinding assembly further includes a first electric motor, a connecting rod, and a telescopic component, the telescopic component is rotatably disposed on a middle of the base plate, the connecting rod is disposed at a top of the telescopic component, the first electric motor is disposed at an end of the connecting rod, an output end of the first electric motor is provided with a rectangular tenon, two side walls of the rectangular tenon are provided with embedded beads, a top of each of the multiple grinding hammer defines a rectangular tenon installation groove, and the rectangular tenon is clamped in the each rectangular tenon installation groove through the embedded beads.

In an embodiment, the grinding assembly further includes a second electric motor, the second electric motor is disposed on the middle of the base plate, and the telescopic component is disposed at an output end of the second motor.

In an embodiment, the vacuum assembly includes a vacuum pump, a first annular tube, multiple vacuum valves and multiple first connecting tubes, the vacuum pump is disposed on the base plate, the multiple first connecting tubes are disposed uniformly in a circumferential direction on the first annular tube, the multiple vacuum valves are disposed on the multiple first connecting tubes, respectively, ends of the multiple first connecting tube are connected to the first through holes, and the first annular tube is communicated with the vacuum pump.

The gas-gathering assembly includes a second annular tube, multiple second connecting tubes, multiple gas-gathering valves, and a gas-gathering pump; the multiple gas-gathering valves are respectively disposed on the multiple second connecting tubes, the multiple second connecting tubes are disposed uniformly in a circumferential direction on the second annular tube, ends of the multiple second connecting tubes are respectively connected to the second through holes, and the second annular tube is communicated with the mass spectrometer, and the gas-gathering pump is disposed on a pipeline between the second annular tube and the mass spectrometer.

A gas extraction method for the metal mineral inclusions utilizes any one of the gas extraction devices for the metal mineral inclusions mentioned above.

The beneficial effects are as follows. Multiple grinding chambers are defined and evenly distributed in a circular shape on the annular carrier, the multiple grinding chambers can hold multiple sets of metal minerals from the same sample for grinding separately, and can grind the particle size of the metal mineral sample to 400 to 600 mesh, effectively and fully releasing the inclusion gas in the metal mineral sample. The multiple sets of metal mineral samples are sequentially vacuumed, ground, and gathered for inclusion gases, improving the accuracy of the test results. The telescopic component drives the first electric motor to move vertically and downwards through the connecting rod, through the clamping of the embedded beads of the rectangular tenon with the grinding hammer, the first electric motor drives the grinding hammer to grind the metal mineral samples in the grinding chamber, and then the telescopic component drives the first electric motor to move vertically upwards, and the telescopic component rotates to drive the first electric motor to rotate and grind in the next grinding chamber until all the samples in the grinding chambers have been ground. The second electric motor drives the telescopic component to rotate, thereby sequentially completing the grinding work of the annular distribution of the grinding chambers, improving the degree of automation and ease of use of the device. Inner and outer sides of each grinding chamber are provided with independent vacuum valve and gas-gathering valve, which can sequentially complete the vacuuming and the gas-gathering of the inclusion of a single grinding chamber. The gas-gathering and analysis of different grinding chambers do not interfere with each other, improving the accuracy of the experiment.

BRIEF DESCRIPTION OF DRAWINGS

In order to describe embodiments of the disclosure or technical solutions in the related art clearer, a brief introduction will be given to the attached drawings required in the description of the embodiments or the related art. It is evident that the attached drawings in the following description are only some embodiments of the disclosure. For those skilled in the art, other attached drawings can be obtained based on the provided drawings without any creative effort.

DESCRIPTION OF REFERENCE SIGNS 10. base plate; 20. annular carrier; 21. grinding chamber; 211. first through hole; 212. second through hole; 30. sealing cover; 41. grinding hammer; 411. rectangular tenon installation groove; 42. first electric motor; 421. rectangular tenon; 422. embedded beads; 43. connecting rod; 44. telescopic component; 45. second electric motor; 51. vacuum pump; 52. first annular tube; 53. vacuum valve; 54. first connecting tube; 61. second annular tube; 62. second connecting tube; 63. gas-gathering valve; 64. gas-gathering pump; 70. mass spectrometer.

DETAILED DESCRIPTION OF EMBODIMENTS

The following will provide a clear and complete description of technical solutions in embodiments of the disclosure, in conjunction with the attached drawings. Apparently, the described embodiments are only some embodiments of the disclosure, not all of them. Based on the embodiments in the disclosure, all other embodiments obtained by those skilled in the art without creative labor fall within the scope of protection of the disclosure.

Embodiment 1

Figure 1:
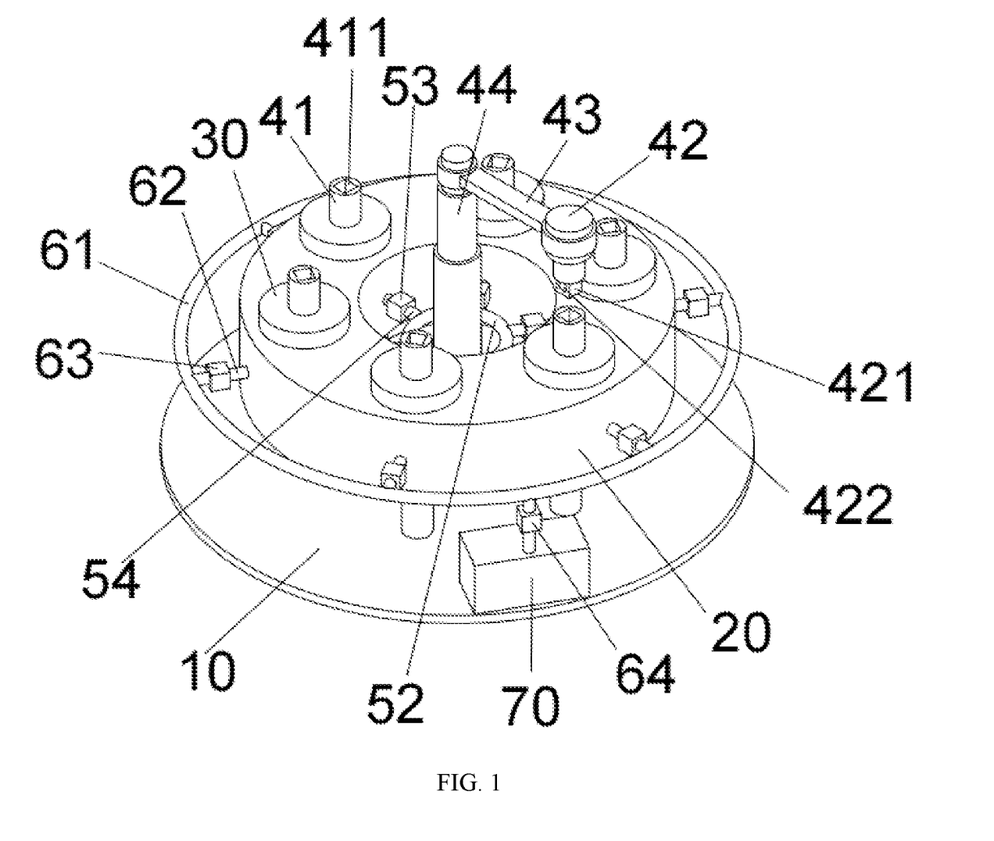
FIG. 1 illustrates a schematic structural diagram of a gas extraction device for metal mineral inclusions.
Figure 2:
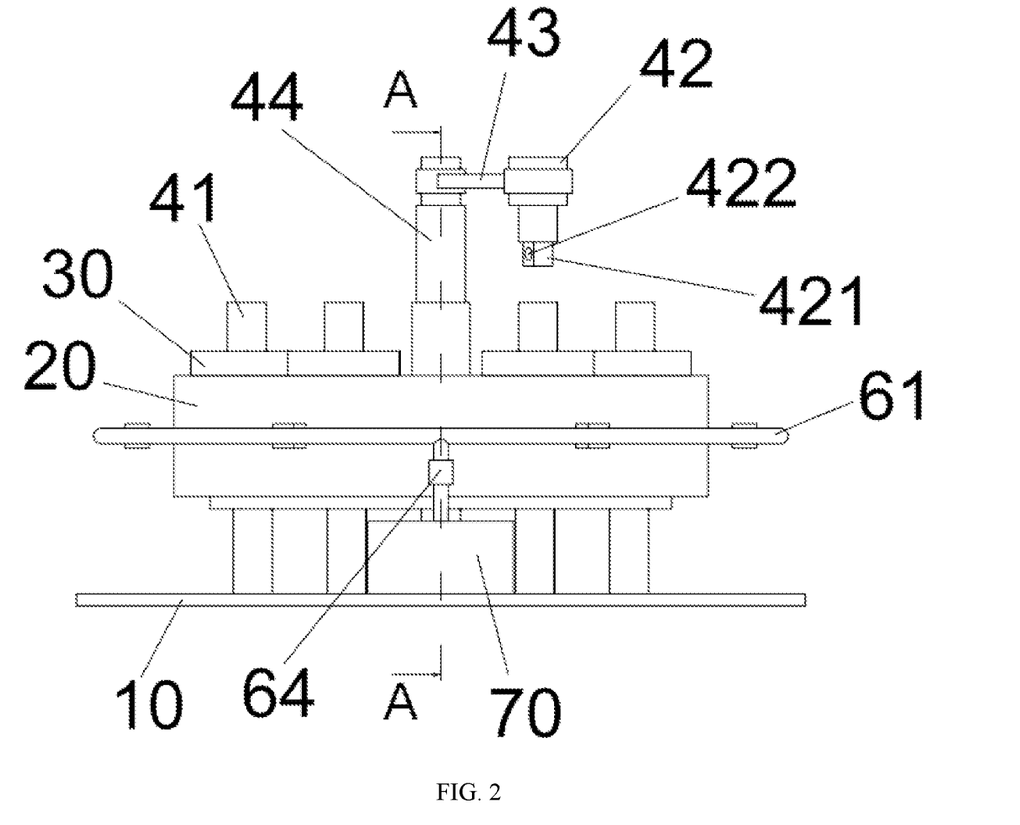
FIG. 2 illustrates a front view of the gas extraction device for the metal mineral inclusions.
Figure 3:
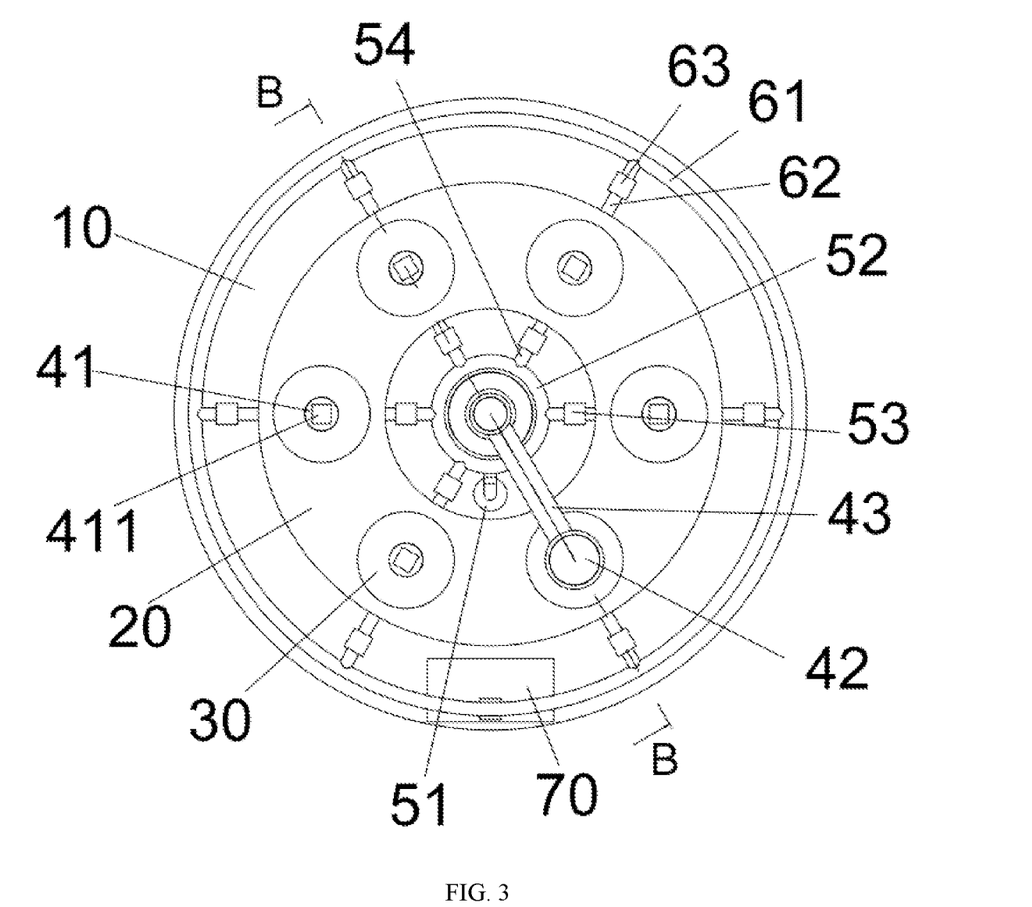
FIG. 3 illustrates a top view of the gas extraction device for the metal mineral inclusions.
Figure 4:
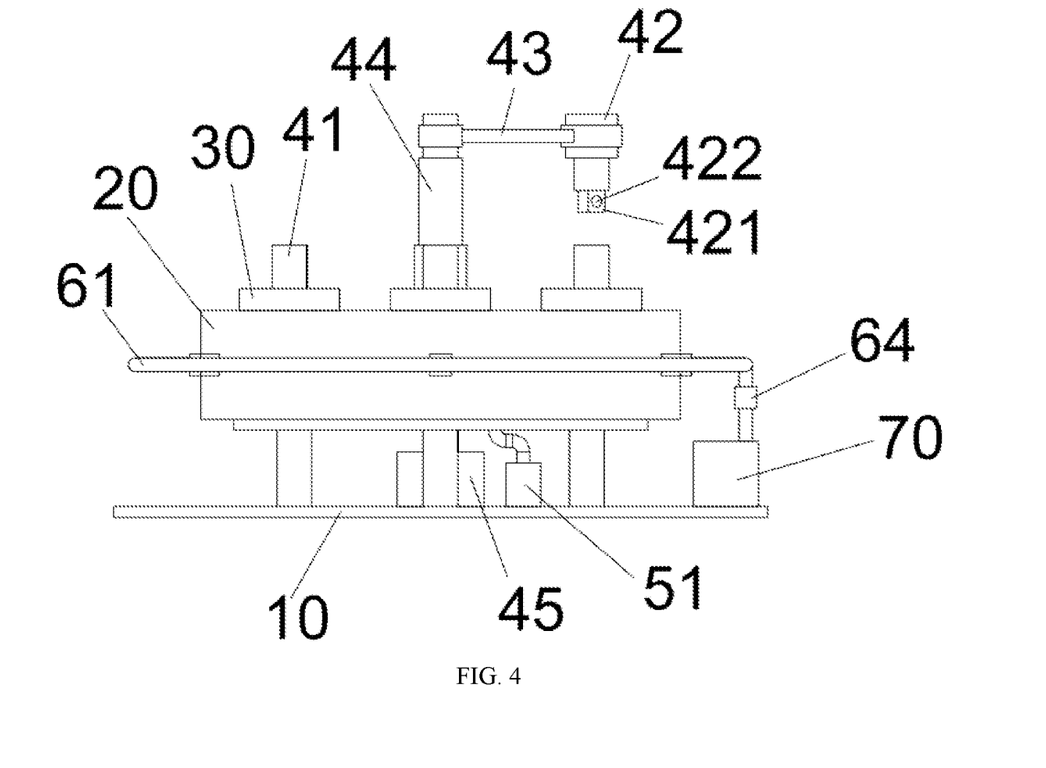
FIG. 4 illustrates a left view of the gas extraction device for the metal mineral inclusions.
Figure 5:
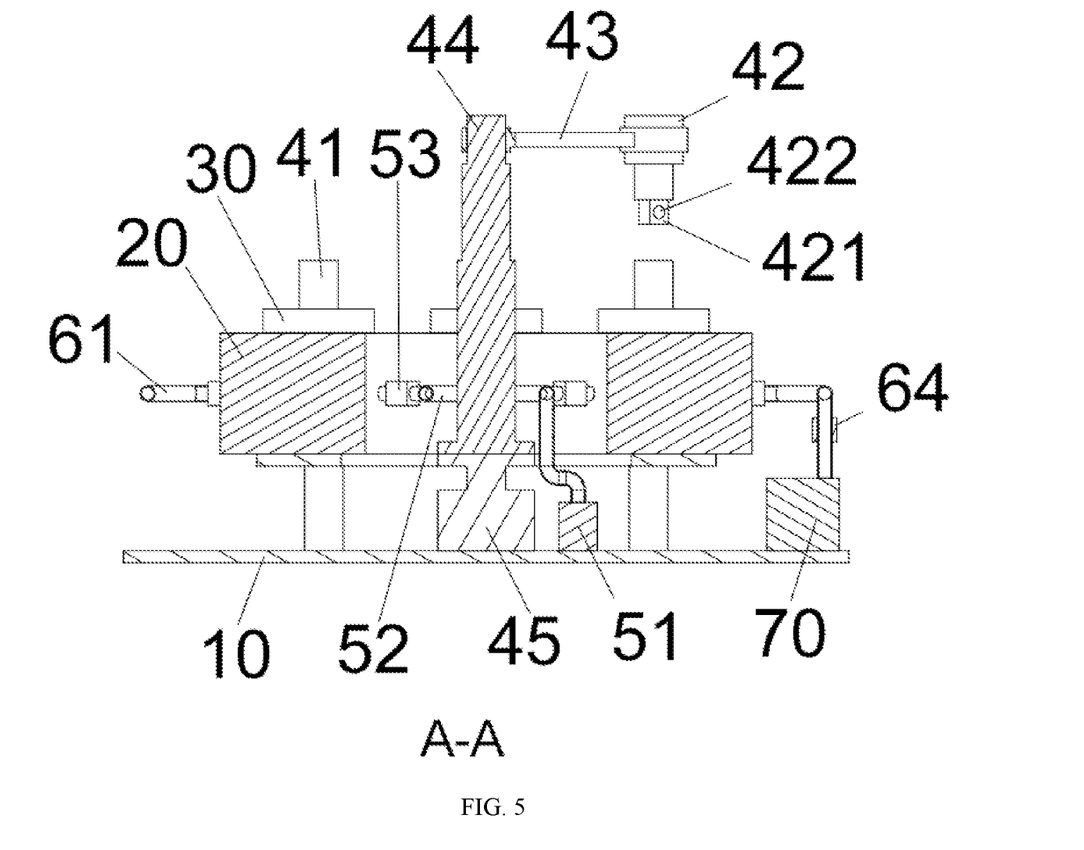
FIG. 5 illustrates a cross-sectional view of the gas extraction device for the metal mineral inclusions illustrated in FIG. 2 along a cutting plane line A-A.
Figure 6:
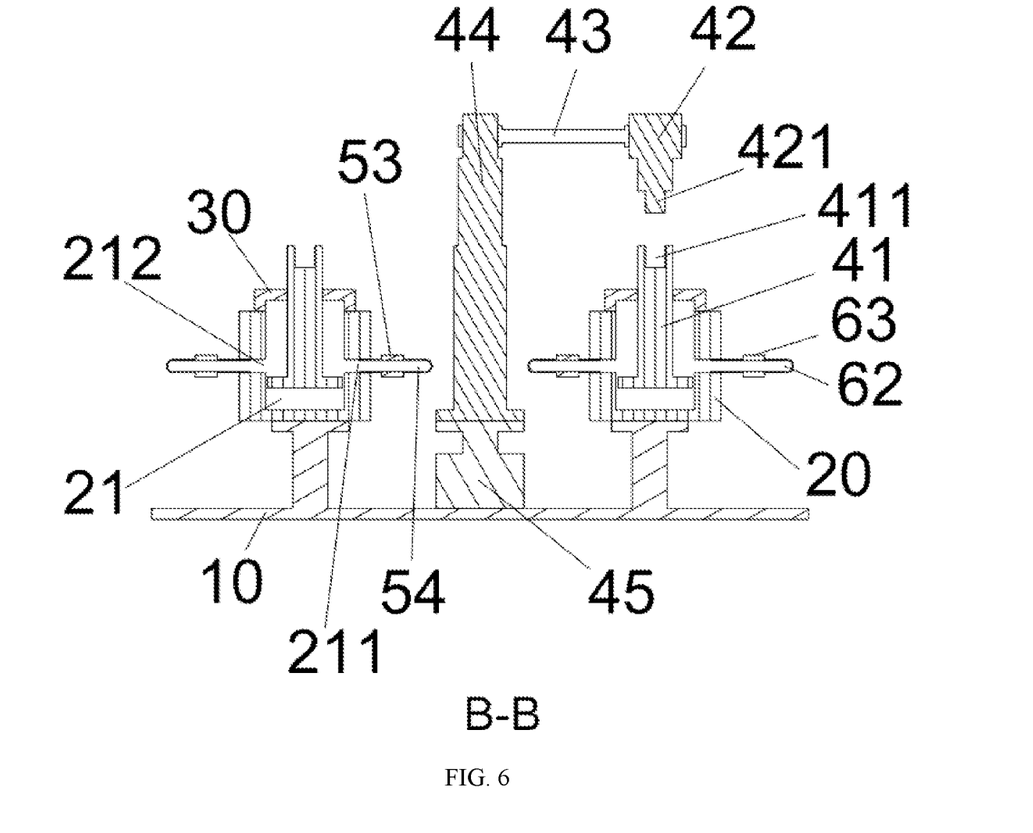
FIG. 6 illustrates a cross-sectional view of the gas extraction device for the metal mineral inclusions illustrated in FIG. 3 along a cutting plane line B-B.

As shown in FIGS. 1 to 6, a gas extraction device for metal mineral inclusions includes a base plate 10, an annular carrier 20, sealing covers 30, a grinding assembly, a vacuum assembly, a gas-gathering assembly and a mass spectrometer 70. The annular carrier 20 is disposed on the base plate 10, and multiple grinding chambers 21 are defined and evenly distributed in a circular shape on the annular carrier 20. The sealing covers 30 are disposed at openings of the grinding chambers 21, the sealing covers 30 can seal the grinding chambers 21 to prevent air leakage. The grinding assembly includes grinding hammers 41, and the grinding hammers 41 penetrate through the sealing covers 30 and extend into the grinding chambers 21. Side walls of each grinding chamber 21 defines a first through hole 211 and a second through hole 212. The vacuum assembly is communicated with the grinding chambers 21 through the first through holes 211. The gas-gathering assembly is communicated with the grinding chambers 21 through the second through holes 212. The mass spectrometer 70 is communicated with the gas-gathering assembly. The multiple grinding chambers 21 evenly distributed on the annular carrier 20 can hold multiple sets of metal minerals from the same sample for grinding separately. The rotation of the grinding hammers 41 can grind the metal mineral samples in the grinding chambers 21, which can grind the particle size of the metal mineral samples to 400-600 mesh, effectively and fully releasing the inclusion gas. The multiple grinding chambers 21 can independently vacuum and gather gas from the inclusion through the first through holes 211 and the second through holes 212. The multiple sets of grinding chambers 21 can independently vacuum, grind, gather gas, and analyze, respectively, and data from the multiple grinding chambers 21 of the same sample are summarized for data analysis and comparison, effectively improving the accuracy of the results.

The grinding assembly further includes a first electric motor 42, a connecting rod 43, and a telescopic component 44. The telescopic component 44 is rotatably disposed on a middle of the base plate 10, the connecting rod 43 is disposed at a top of the telescopic component 44, the first electric motor 42 is disposed at an end of the connecting rod 43, the telescopic component 44 drives the first electric motor 42 to move vertically up and down, and the telescopic component 44 can rotate freely and drive the first electric motor 42 to rotate in a circumferential direction. An output end of the first electric motor 42 is provided with a rectangular tenon 421, two side walls of the rectangular tenon 421 are provided with embedded beads 422, a top of each grinding hammer 41 defines a rectangular tenon installation groove 411, and the rectangular tenon 421 can be clamped in the rectangular tenon installation groove 411 through the embedded beads 422, the rectangular tenon 421 can be easily and quickly disassembled from the rectangular tenon installation grooves 411, enabling the first electric motor 42 to sequentially drive the grinding hammers 41 in multiple grinding chambers 21 to rotate.

The grinding assembly further includes a second electric motor 45, the second electric motor 45 is disposed on the middle of the base plate 10, and the telescopic component 44 is disposed at an output end of the second motor 45. The second motor 45 drives the telescopic component 44 to rotate, sequentially completing the grinding work of the annular distribution of the grinding chambers 21, improving the degree of automation and ease of use of the device.

The vacuum assembly includes a vacuum pump 51, a first annular tube 52, multiple vacuum valves 53 and multiple first connecting tubes 54. The vacuum pump 51 is disposed on the base plate 10, the multiple first connecting tubes 54 are disposed uniformly in a circumferential direction on the first annular tube 52, the multiple vacuum valves 53 are disposed on the multiple first connecting tubes 54, respectively, ends of the multiple first connecting tubes 54 are connected to the first through holes, and the first annular tube 52 is communicated with the vacuum pump 51. When one of the grinding chambers 21 is working, the corresponding vacuum valve 53 of the one of the grinding chambers 21 is turned on, the other vacuum valves 53 are turned off, the vacuum pump 51 vacuums the grinding chamber 21. When the next one of grinding chambers 21 is grinding, the corresponding vacuum valve 53 of the grinding chamber 21 is turned off, and the vacuum valve 53 of the next grinding chamber 21 is turned on. Each grinding chamber 21 can be independently vacuumed.

The gas-gathering assembly includes a second annular tube 61, multiple second connecting tubes 62, multiple gas-gathering valves 63, and a gas-gathering pump 64. The multiple gas-gathering valves 63 are respectively disposed on the multiple second connecting tubes 62, the multiple second connecting tubes 62 are disposed uniformly in a circumferential direction on the second annular tube 61, ends of the multiple second connecting tubes 62 are respectively connected to the second through holes 212, and the second annular tube 61 is communicated with the mass spectrometer 70. The gas-gathering pump 64 is disposed on a pipeline between the second annular tube 61 and the mass spectrometer 70. When the grinding of one of the grinding chambers 21 is completed, the corresponding gas-gathering valve 63 of the grinding chamber 21 is turned on, the other gas-gathering valves 63 are turned off, and the gas-gathering pump 64 gathers the gas from the inclusion in the grinding chamber 21. When gathering gas from the next grinding chamber 21, the corresponding gas-gathering valve 63 of the grinding chamber 21 is turned off, and the gas-gathering valve 63 of the next grinding chamber 21 is turned on. Each grinding chamber 21 can conduct independent gas-gathering, and the gathered inclusion gas is introduced into the mass spectrometer 70 through the gas-gathering valves 63 for experimental analysis.

Embodiment 2

A gas extraction method for the metal mineral inclusions includes the following steps.

S1. The sealing covers 30 of the multiple grinding chambers 21 on the annular carrier 20 are removed, the grinding hammers 41 are lifted out. The same metal mineral sample is divided into multiple sets, and followed by respectively placing in the grinding chambers 21, then the grinding hammers 41 are placed back in the grinding chambers 21, and then the multiple sets of grinding chambers 21 are sealed with the sealing covers 30.

S2. The second electric motor 45 drives the telescopic component 44 to rotate, thereby aligning the rectangular tenon 421 on the first electric motor 42 with the rectangular tenon installation groove 411 of the grinding hammer 41 in one grinding chamber 21, then the telescopic component 44 contracts, a height of the first electric motor 42 is lowered to make the rectangular tenon 421 extend into the rectangular tenon installation groove 411, and make the embedded beads 422 be clamped in the rectangular tenon installation groove 411. In this situation, the corresponding vacuum valve 53 of the grinding chamber 21 is turned on, and the other vacuum valves 53 are turned off, the gas-gathering valves 63 corresponding to the grinding chambers 21 are all turned off, and the vacuum pump 51 starts to vacuum the grinding chambers 21. After the vacuum pumping is completed, the vacuum valve 53 is turned off. The first electric motor 42 drives the corresponding grinding hammer 41 to rotate, thereby grinding the metal mineral sample, and the particle size of the sample is ground to 400-600 mesh, followed by turning on the gas-gathering valve 63 corresponding to the grinding chamber 21, and turning off the other gas-gathering valves 63. Finally, the gas-gathering pump 64 works to gather the inclusion gas to transport into the mass spectrometer 70 for experimental analysis.

S3. After the vacuuming, grinding, and gas gathering of one of the grinding chamber 21 are completed, the second electric motor 45 drives the telescopic component 44 to rotate, followed by repeating S2, and sequentially completing the gathering of the inclusion gas of the samples in the remaining grinding chambers 21 of the annular carrier 20.

S4. The experimental analysis is performed on the inclusion gas in the multiple grinding chambers 21 of the same sample by using mass spectrometer 70 to obtain data, and the data are summarized.

The various embodiments in the disclosure are described in a progressive manner, and each embodiment focuses on the differences from other embodiments. The same and similar parts between each embodiment can be referred to each other. For the device disclosed in the embodiment, due to its correspondence with the method disclosed in the embodiment, the description is relatively simple. Please refer to the method section for relevant details.

The above description of the illustrated embodiments enables those skilled in the art to implement or use the disclosure. The various amendments to the embodiments will be apparent to those skilled in the art, and the general principles defined in this disclosure can be implemented in other embodiments without departing from the spirit or scope of the disclosure. Therefore, the disclosure will not be limited to the embodiments illustrated herein, but rather to the widest range consistent with the principles and novel features disclosed herein.

What is claimed is:

1. A gas extraction device for metal mineral inclusions, comprising:
    a base plate, an annular carrier, sealing covers, a grinding assembly, a vacuum assembly, a gas-gathering assembly, and a mass spectrometer;
    wherein the annular carrier is disposed on the base plate, a plurality of grinding chambers are defined and evenly distributed in a circular shape on the annular carrier; the sealing covers are disposed at openings of the grinding chambers; the grinding assembly comprises grinding hammers penetrating through the sealing covers and extending into the grinding chambers; side walls of each of the plurality of grinding chamber define a first through hole and a second through hole; the vacuum assembly is communicated with the grinding chambers through the first through holes; the gas-gathering assembly is communicated with the grinding chambers through the second through holes; and the mass spectrometer is communicated with the gas-gathering assembly;

wherein the vacuum assembly comprises a vacuum pump, a first annular tube, a plurality of vacuum valves and a plurality of first connecting tubes; the vacuum pump is disposed on the base plate, the plurality of first connecting tubes are disposed uniformly in a circumferential direction on the first annular tube, the plurality of vacuum valves are disposed on the plurality of first connecting tubes respectively, ends of the plurality of first connecting tubes are connected to the first through holes, and the first annular tube is communicated with the vacuum pump;

wherein the gas-gathering assembly comprises a second annular tube, a plurality of second connecting tubes, a plurality of gas-gathering valves, and a gas-gathering pump; the plurality of gas-gathering valves are respectively disposed on the plurality of second connecting tubes, the plurality of second connecting tubes are disposed uniformly in a circumferential direction on the second annular tube, ends of the plurality of second connecting tubes are respectively connected to the second through holes, the second annular tube is communicated with the mass spectrometer, and the gas-gathering pump is disposed on a pipeline between the second annular tube and the mass spectrometer.

2. The gas extraction device for the metal mineral inclusions as claimed in claim 1, wherein the grinding assembly further comprises a first electric motor, a connecting rod, and a telescopic component; the telescopic component is rotatably disposed on a middle of the base plate, the connecting rod is disposed at a top of the telescopic component, the first electric motor is disposed at an end of the connecting rod, an output end of the first electric motor is provided with a rectangular tenon, two side walls of the rectangular tenon are provided with embedded beads, a top of each of the plurality of grinding hammer defines a rectangular tenon installation groove, and the rectangular tenon is clamped in the rectangular tenon installation groove through the embedded beads.

3. The gas extraction device for the metal mineral inclusions as claimed in claim 2, wherein the grinding assembly further comprises a second electric motor, the second electric motor is disposed on the middle of the base plate, and the telescopic component is disposed at an output end of the second motor.

4. A gas extraction method for the metal mineral inclusions, comprising:
extracting gas from the metal mineral inclusions by using the gas extraction device for the metal mineral inclusions as claimed in claim 1.

\* \* \* \* \*